United States Patent [19]
Thompson

[11] Patent Number: 5,530,773
[45] Date of Patent: Jun. 25, 1996

[54] OPTICAL CHARACTER RECOGNITION AND ITEM MATCHING ASSISTED BY PROGRESSIVELY DECREASING MATCH CRITERIA

[76] Inventor: Ralph E. Thompson, 7909 Meadowdale La., Charlotte, N.C. 28212

[21] Appl. No.: 175,033

[22] Filed: Dec. 29, 1993

[51] Int. Cl.⁶ .............................. G06K 9/00; G06F 15/30
[52] U.S. Cl. ............................................ 382/138; 235/379
[58] Field of Search ............................... 382/7, 135, 138; 235/379, 437, 454; 364/401, 406; 209/534, 584

[56] References Cited

U.S. PATENT DOCUMENTS

| | | | |
|---|---|---|---|
| 4,264,808 | 4/1981 | Owens et al. | 235/379 |
| 4,734,859 | 3/1988 | Hamaguchi et al. | 235/379 |
| 4,813,077 | 3/1989 | Woods et al. | 382/7 |
| 5,040,226 | 8/1991 | Elischer et al. | 382/7 |
| 5,040,227 | 9/1991 | Lyke et al. | 382/7 |
| 5,058,182 | 10/1991 | Kuan et al. | 382/25 |
| 5,187,351 | 2/1993 | Clary | 235/454 |

*Primary Examiner*—Joseph Mancuso
*Assistant Examiner*—Gerard Del Rosso
*Attorney, Agent, or Firm*—Laurence R. Letson

[57] ABSTRACT

An assisted character recognition process is described which utilizes the relative position of an amount from a negotiable instrument, such as a check or credit card receipt, in a sequence of such amounts and compares its relative position to the relative position of an identical amount in a sequence of amounts on a second source, such as an adding machine tape, in order to determine the order of the items; the process also establishes matching elements which may be varied in stringency during sequential iterations of the matching process whereby the relaxation of the matching criteria will sequentially result in increased matches to allow the largest possible number of matches between the "courtesy" amounts on the checks and the amounts or entries on the second source or adding machine tape. This process is especially useful for matching handwritten entries to similar entries on a second source list such as an adding machine tape, or other such printout.

12 Claims, 3 Drawing Sheets

| FIG. 3A |
| FIG. 3B |

OPTICAL CHARACTER RECOGNITION AND ITEM MATCHING ASSISTED BY PROGRESSIVELY DECREASING MATCH CRITERIA

FIELD OF THE INVENTION

This invention relates to a method of matching numerical amounts in a group of items or source list to entries in a second source list, and more specifically to matching of the optically character recognized courtesy amounts on documents such as checks to amounts on a second source list such as an adding machine tape or a deposit slip.

BACKGROUND OF THE INVENTION

Although many commercial bank checks, money orders and similar negotiable documents typically carry dollar amounts which are machine printed or typed, personal checks predominantly are handwritten. Personal checks typically have two fields for the entry of the amount of the draft, the fully written out or "legal" amount as well as a numerical or "courtesy" amount. Credit card charge slips also indicate in handwritten numerical form the total amount in a predetermined field on the charge slip.

Banks receive deposits from businesses which may include a number of checks or a number of credit card charge slips or receipts. The deposit also will typically have a deposit slip accompanying it which identifies the date of the transaction, the account of the depositor and the total amount. The checks or credit card charge slips typically are accompanied by an adding machine tape providing a listing of the amounts of the checks or charge slips and a total representing the total quantity of those documents. Many commercial deposit slips will not have an itemized listing thereon of all the checks being deposited but rather a general entry indicating the total amount of the checks accompanying the deposit slip. The adding machine tape typically is required by the bank whenever a single consolidated entry on the deposit slip reflects the aggregate dollar amount of all the checks being deposited.

Dependent upon the techniques of the clerk preparing the deposit, the check on the top of the deposit stack may correspond to either the first or last item of the deposit adding machine tape entries. A very significant characteristic of a deposit, from a processing viewpoint, is the sequence of the items being deposited. In addition to defining a sequence of the item amounts, the adding machine tape typically provided to the bank by the depositor is a relatively easily scanned data source due to well defined character shapes and styles and therefore provides a much higher reliability in character recognition than any handwritten item amounts of the checks. In most cases the adding machine tape amounts generally will correspond to the check or first source item amounts in sequence but also may have: amounts on the tape that do not correspond to the deposited first source items, such as the typical 0.00 entry or an alphabetic entry printed as the entries are cleared by the adding machine; and the inclusion of erroneous amounts followed by an identical erroneous amount of opposite sign to reverse and cancel the erroneous entry or such other entries as subtotals.

Upon receipt from the depositor, the bank teller will send the deposit consisting of the adding machine tape, deposited checks, and the deposit slip to a bookkeeping operator to be optically scanned in order to store electronic images of these documents in the memory of the scanning apparatus. Once the scanning has occurred, optical character recognition analysis is performed on at least selected portions of the checks, the deposit slip and the supporting adding machine tape. The optical character recognition analysis is performed specifically on the courtesy amount field of the checks to determine the dollar amount of each of the instruments being deposited. In addition, optical character analysis is performed on the deposit slip to determine the total amount of checks being deposited and the entire series of entries on the adding machine tape, as well as the tape total.

Following the scanning operations and optical character recognition analysis, a sequence of numbers or amounts derived from the second source list will be stored within the memory of the scanning apparatus used to optically scan the checks and other supporting documents along with a series of amounts derived from the courtesy amount field of the checks in the deposit. Once all entry scanning and optical character recognition is completed it is desirable to attempt to electronically match the handwritten amounts in the courtesy amount field of each check with an identical amount entered on the adding machine tape as well as to match the amount of the total of the adding machine tape with the total indicated on the deposit slip or the negotiable instruments being deposited. The scanning and optical character recognition device total the two series and compare the totals with the optically scanned and character recognized total from the deposit slip. If the totals do not match, then the entire deposit is rejected and the deposit must be reconciled and balanced by a clerk who displays an image of each item and verifies the courtesy amount; and if the scanned result is incorrect, the clerk must correct the amount that is stored in the memory of the apparatus. This reconciliation and correction of the scanning errors and any other errors which may reside in the consolidated deposit is time consuming.

U.S. Pat. No. 5,040,226 to Victor E. Elischer, et al., discloses the above process and then recomputes the total upon each correction of an erroneously scanned or character recognized amount. The corrections and the recomputation occur until the totals of the adding machine tape, the deposit slip and the individual checks all agree.

With the system of U.S. Pat. No. 5,040,226, the character recognition error of any character in any courtesy amount field of any of the items being deposited will reject the entire transaction for human reconciliation.

The recognition of numbers is unreliable at times due to the placement, style, different forms that the numbers may take, and the relative spacing between numbers. While recognition rates are good and efforts continue to improve the rates, there is no known technique to character recognize all handwritten amounts with 100 percent accuracy. Whenever only a small number of items of a deposit do not correctly character recognize, the rejection of the entire transaction for reconciliation greatly reduces the benefits of the character recognition analysis.

SUMMARY OF THE INVENTION

It is an object of the invention to match item amounts from deposited first source items with corresponding entries on a secondary source list using optical scanning and character recognition analysis.

It is another object of the invention to remove the highest confidence matches from the pool of amounts and entries at an early stage.

It is another object of the invention to successively identify matches under relaxing match criteria.

It is still another object of this invention to provide matched data for subsequent use to reject or correct item amounts or entries based upon the second source amounts.

DRAWINGS

FIG. 3, comprised of FIGS. 3A and 3B, is a flow diagram illustrating the steps of the matching process using progressively relaxed match criteria in each iterative matching step.

DETAILED DESCRIPTION OF THE PREFERRED EMBODIMENT OF THE BEST MODE CONTEMPLATED BY THE INVENTOR FOR CARRYING OUT THE INVENTION

Figure 1:
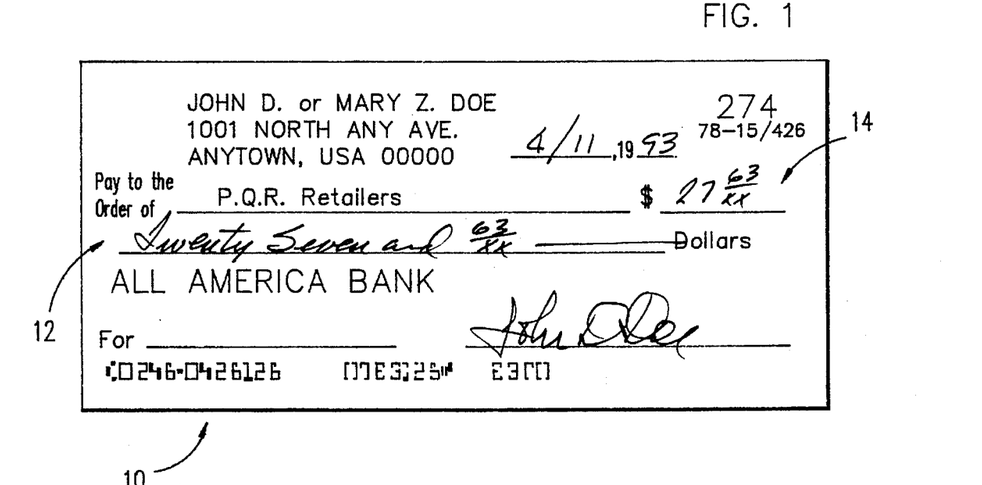
FIG. 1 illustrates a personal check completed for negotiation.

FIG. 1 illustrates a representation of a handwritten personal check which has been completed by the maker, John Doe, in the amount of $27.63. The check 10 has two fields 12 and 14 used to designate the amount of the instrument. The amount expressed by words and numbers in field 12 is commonly referred to as the "legal" amount of the instrument while the numerical amount in field 14 is commonly referred to as the "courtesy" amount. Customarily, banks utilize the "courtesy" amount on the check until such time as it is discovered that the "courtesy" amount and the "legal" amount do not correspond. In that case then the amount in field 12 which has been written in words and numbers is considered the controlling amount. For purposes of check processing, however, most banks rely on the "courtesy" amount because the "courtesy" amount in field 14 has been found to correspond exactly to the amount in field 12 in an extremely high percentage of cases.

Further, with the use of scanning and optical character recognition equipment in the processing of the checks passing through a bank or other financial institution, the amount in field 14 is typically scanned with character recognition analysis performed on the scan results because character recognition of numbers is much more reliable than cursive handwriting typically used in field 12. An understanding of the characteristics of a typical deposit transaction is helpful in approaching improved character recognition and assistance in automatic reconciliations.

As a merchant prepares the bank deposit for his business, the amount of each check typically would be summed. The total of the checks then would be typically entered onto a deposit slip or similar document as a complete total for all checks attached thereto. Whenever this technique is utilized by the merchant, the banks require that the stack of checks being deposited be accompanied by an adding machine tape 26 as in FIG. 2 or similar style record that will indicate the amount of each check and the total deposit 36. Since the merchant normally will total the checks on an adding machine prior to recording the amount of the check total onto the deposit slip, the provision of the adding machine tape to the bank is of no substantial burden to the merchant.

Figure 2:
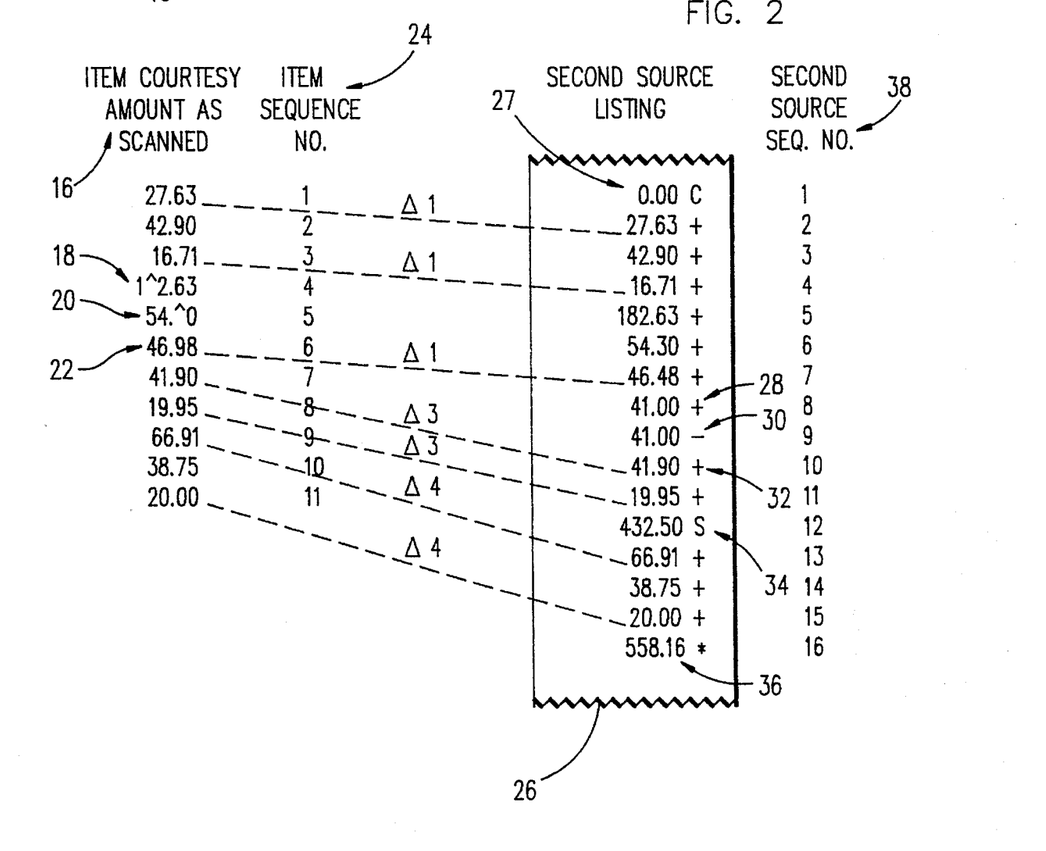
FIG. 2 represents the data contained within a memory of a scanning and character recognition device.

For manual reconciliations, the bank then may compare the amounts in the "courtesy" amount field 14 of check 10 to the amount reflected on the second source, for example, adding machine tape 26; and if all amounts are correct on the adding machine tape 26 and correspond to a deposited item, such as check 10, then the adding machine tape total 36 can be accepted as the total of all checks deposited. This relieves the bank of another bookkeeping step such as repetitively totalling all the amounts on checks included in the deposit.

With the increased use of optical scanning and optical character recognition, images of the checks now are scanned into an optical scanner along with an image of the deposit slip or the adding machine tape's sequence of amounts correspondent to the amounts on the checks and stored in an appropriate memory. An operator then can recall the electronic images of each first source item in the deposit on a display and visually compare it with the image of the adding machine tape. Once all item amounts on the adding machine tape and the images of the instruments or checks have been matched, then the total of the deposit has been balanced and the deposit then may proceed for further processing.

With the addition of character recognition, the need for the operator to identify each and every entry on the adding machine tape 26 and correlate it with an identical entry in the "courtesy" amount field 14 of the check 10 as part of the deposit may be overcome so long as the character recognition analysis is adequate to positively identify the handwritten amounts in field 14. While the complete images of each of the deposited amounts continue to be scanned and stored in electronic memory for recall as necessary, the scanned amounts from each first source item are sequentially stored and analyzed using a character recognition algorithm to produce a list or series of dollar amounts which make up the deposit. This series of amounts, in the order in which they are scanned, are assigned an item sequence number as they appear in column 24 representing the position in the series which each particular dollar amount occupies.

Referring again to FIG. 2, the contents of the memory of the optical scanning and character recognition equipment may be represented by the column of amounts indicated by reference numeral 16 and serves as a first source list of individual first source item amounts. As can be noted with respect to first source item amount 18 and 20 wherein the character recognition analysis was unable to properly and adequately recognize at least one character within each of the entries 18, 20, the amount is represented by those characters which are recognized and another symbol for unrecognized characters. To indicate the error or a failure to identify the handwritten character, a caret is inserted in the position where any character is unintelligible to the character recognition algorithm.

Item amount $46.98 designated with reference numeral 22 illustrates what is known as a substitution error. This type of error is the most serious since the processing equipment does not recognize the error as it does with the rejection errors having the caret. In this case the character scanned and recognized as a "9" in reality was a "4". Thus, a "9" was substituted for another number and became a substitution error.

As will be noted in FIG. 2, the "courtesy" amount is scanned and character recognized as listed in column 16. In column 24 an first source item sequence number representing the sequential order of each item as it was scanned and character recognized has been assigned to each of the amounts in column 16 and is shown next to the respective first source item in column 16. This list of amounts together with the associated sequence number for each amount is stored in a memory associated with the scanner and is a first source list. The second source list represents an adding machine tape 26. The second source list is representative of the figures which were keyed by the clerk to prepare the deposit.

Entry 28 of $41.00 was recognized by the clerk as an erroneous entry and the next entry on the tape 26 is an entry 30 for $41.00 with a minus sign indicating that the erroneous entry of $41.00 at 28 has been subtracted to effectively negate the clerk's erroneous entry 28. Thereafter, the proper entry 32 of $41.90 has been entered. Since these figures appear on the second source listing 26 and are scanned, each of these two entries 28, 30 are assigned second source sequence numbers 8 and 9, respectively. One will appreciate that the insertion of second source amounts 28 and 30 will shift the sequence numbers for all subsequent amounts listed on the tape as scanned and character recognized.

Another example of an entry on the second source tape 26 which will further affect sequence numbers is amount 34 which is a subtotal of all items preceding it. Since there is no corresponding subtotal to be scanned from any check 10 or similar document, this number 34 then will be an amount which can confuse or interfere with the orderly matching of the amounts in column 16 with the entries on the second source listing 26.

Still another amount shown on second source tape 26 which will not be found on the instrument scanned will be entry 36 which represents the total of all amounts entered into the adding machine 26.

To understand the determination of the sequence delta, also referred to as SeqDelta, several examples will be discussed. As some examples of determining SeqDelta, if a match is found between the dollar amount $27.63 listed as the first amount in column 16 and the second amount in the column of the second source tape 26, the difference between the sequence numbers in this case, 1 and 2, is 1 or a delta of 1. Similarly, the amounts for item sequence number 3 in column 24 and first source item sequence number 4 in column 38 are identical and would result in a match with a delta of 1. The delta would remain the same for entry 18 and the entry on the second source tape 26 corresponding to sequence number 5. Note that item sequence number 7 in column 24 corresponds with a dollar amount of $41.90 which will match with entry 32 on the second source listing 26. Entry 32 is assigned a sequence number of 10 due to the additional adding machine entries for the clearing operation 27 which is sequence number 1, and the erroneous entry 28 and the correcting entry 30. The net result of these other entries in the second source tape 26 is to increase the delta to 3. When entry 34 is made, representing the subtotal of all previous entries keyed into the adding machine, the delta between the next corresponding amount on each list 16, 26 becomes 4 and continues at 4 through sequence number 11 in column 24 and sequence number 15 in column 38.

Now that preliminary matches have been made for at least those entries, having item sequence numbers 1, 3, 6, 7, 8, 9 and 11, the average sequence delta or AvgSeqDelta may be calculated by averaging the sequence deltas or SeqDelta, for each of the pairs of items declared preliminary matches. Once the AvgSeqDelta has been determined, the statistical variance VarSeqDelta of the SeqDelta's may be calculated. The calculation of the VarSeqDelta value may be computed using the following equation which is a well known relationship in statistical analysis.

$$VarSeqDelta = Sum\ (\ (SeqNo(i) - AvgSeqDelta)**2)/(n-1) \quad (1)$$
$$i=1,n$$

where n is the number of matched entries

Once the calculation of equation (1) is performed and the value determined for VarSeqDelta, then the order of the second source entries 26 is inverted by the scanning and character recognition equipment for the computer to which it is connected and thereby will simulate the list being in reverse order. Thereafter, the preceding preliminary matching and the determination of the sequence numbers for the preliminary matches, the AvgSeqDelta and the VarSeqDelta again are determined with the second source entries being considered in the reversed order. With the VarSeqDelta now computed in both directions, the results are considered; and if one of the VarSeqDelta values is significantly larger (greater than three times the other), then the match class will be determined as either forward or reverse. The match class is declared forward in the event that the initial sequence numbers used resulted in the lesser VarSeqDelta and reverse in the event that the reversed sequence numbers resulted in the lesser VarSeqDelta. If there is no significant difference (less than three times) between the VarSeqDelta determined in either of the orders of sequence numbers for the second source list 26, then the match class is declared as "other" and cannot be effectively handled by the algorithms and analysis as described herein and will normally be rejected to manual reconciliation and balancing. This may result if the stack of checks was dropped and were gathered up out of sequence.

In the event that the reverse match class is declared, the inverted second source sequence numbers used during the second calculation of the VarSeqDelta are made permanent and are used thereafter as the sequence numbers in the analysis of the two listings of entries.

The algorithm for determining the inverted or new sequence number for each second source entry is:

$$(New)\ SeqNo = N + 1 - (Old)SeqNo \quad (2)$$

where N is the total number of second source entries

The disclosed technique may be used quite satisfactorily in situations where there are multiple preliminary matches having the same dollar amount in the entries, such as where several checks are listed with the identical amounts. In the event that this occurs, all the entries of identical value are determined and their sequence numbers averaged. Thereafter, the average sequence number of the second source entries having a like amount is used. The result of this averaging is that the contribution of such matches to the calculations of the AvgSeqDelta and VarSeqDelta is weighted by the lesser of the number of items or the number of entries sharing the like amount. At this point in the analysis the match class, either forward or reverse, AvgSeqDelta and the VarSeqDelta have all been determined. As each entry from column 16 is matched with an amount on the second source tape 26 thereafter, matches between items in column 16 and entries on the second source tape 26 are declared in subsequent stages according to whether the item amounts and the second source entries meet a set of match criteria. The set of match criteria may include, but is not necessarily limited to, combinations of the match elements which are described below. The particular combination for each stage is selected such that the restrictions on making the matches are progressively relaxed as the matching process progresses from earlier stages to successive stages. The match elements and their respective states are listed and explained below.

Match Elements

1. First Source Item Reject

No — Only first source items with no rejected characters will be considered for the current stage matching.

Yes — Only first source items with rejected characters will be considered for the current stage matching.

2. Second Source Rejects

NO — Only second source entries with no rejected characters will be considered for the current stage matching.

Yes — Only second source entries with rejected characters will be considered for the current stage matching.

3. Character Count Equal

NO — Only first source items and second source entries with respective character counts differing by one (+1 or −1) will be considered for the current stage of matching. Character counts that differ by more than one could be specified by defining an additional match element or elements.

Yes — Only first source first source items and second source entries with respective character counts identically equal will be considered for the current stage matching.

4. Character Substitution

No — Items and second source entries will be matched only if their respective non-rejected characters (that is, digits 0 through 9) are identically equal.

Yes — Items and second source entries will be matched only if their respective non-rejected characters (that is, digits 0 through 9) are identically equal except for one and only one character which will differ between item amount and the second source entry, or a single character substitution. Matches made involving multiple substitutions could be specified by defining an additional match element or elements.

5. Sequence Increment

The allowable sequence delta or SeqDelta between first source items and second source entries that may be matched is confined to the AvgSeqDelta plus or minus a specified increment, the increment in turn being a function of VarSeqDelta and the match stage. That is, in general, smaller increments will be specified in earlier stages (in keeping with stricter enforcement match criteria in earlier stages) and smaller increments will be specified when the VarSeqDelta has lower values.

6. Within Matched Group

NO — First Source Items and entries can be matched whether or not they are grouped as described below.

Yes — First Source Items and entries must be within the same match group in order to be considered for matching. The grouping process in addition to the above SeqDelta selection and the items in second source entries will at appropriate times during the overall process be assigned to groups whose members are likely to be in exact consecutive order.

The likelihood that groups will have first source items or second source entries in identical order is based on the fact that the first and last member in each item group have been matched with the first and last member, respectively, of an associated second source entry group with the sequence deltas of said matches being identical and, further, that the sequence deltas of any matched members within any group also are identical to the sequence deltas of the first and last or boundary members of their respective groups.

Referring again to FIG. 2 and with the assumption, by way of example, that the item amount of $42.90, being sequence number 2 of column 16, the identical amount being sequence number 3 as it appears on the second source tape 26 has not been matched; but that the first source item amounts immediately preceding and following the $42.90 entry in column 16 and the amounts immediately preceding and following the $42.90 entry on the second source tape 26 have been matched inasmuch as their sequence deltas also have been determined to be 1. In both cases, a group is formed. Thus, a group has been defined of first source item amounts with sequence numbers one, two and three and second source entries with sequence numbers two, three and four meeting the criteria for a group.

As an example of the selection of match criteria for successive stages of matching where the easiest matches and the most reliable matches occur early in the process and then the match criteria is strict and subsequently relaxed to permit the matching of first source items and second source entries which are more difficult to declare as matches. Table 1, below, indicates a stage number or an iteration number in the matching process and each of the columns represent the state of the match criteria for each of the six defined match criteria for each of the stages or iterations:

TABLE 1

| Stage Number | (1) Item Rejects | (2) AMT Rejects | (3) Char Cnt Equal | (4) Char Subs | (5) Seq Inc | (6) Match Group |
| --- | --- | --- | --- | --- | --- | --- |
| 1 | NO | NO | YES | NO | 2 | NO |
| 2 | YES | NO | YES | NO | 2 | NO |
| 3 | NO | YES | YES | NO | 2 | NO |
| 4 | YES | NO | NO | NO | 2 | NO |
| 5 | NO | YES | NO | NO | — | YES |
| 6 | NO | NO | YES | YES | — | YES |
| 7 | NO | NO | YES | NO | 3 | NO |
| 8 | YES | NO | YES | NO | 3 | NO |
| 9 | NO | YES | YES | NO | — | YES |

As one can see, the relaxation of the match criteria between stage one and stage two is that the Item Reject criteria changed from a state of NO to YES with all other criteria remaining the same. Similarly, the relaxation of the criteria between stages two and three involves the returning to a NO state for item rejects but the changing of the state to a YES for adding machine tape (AMT) Rejects. A similar comparison will show how the match criteria are sequentially and iteratively altered so that the overall stringency of the match criteria is varied and relaxed through subsequent stages of matching. As the total criteria is relaxed, more matches will be declared until either the entire sequence of iterations through stages one through nine has occurred or all items have been matched.

As each first source item amount is matched with an entry on the second source, that particular item amount and second source entry are no longer available for match comparisons and are flagged as a tentative match. Thus, the pool of possible entries and amounts to be matched becomes smaller and the criteria is successively relaxed to declare more preliminary matches.

Figures 3, 3A:
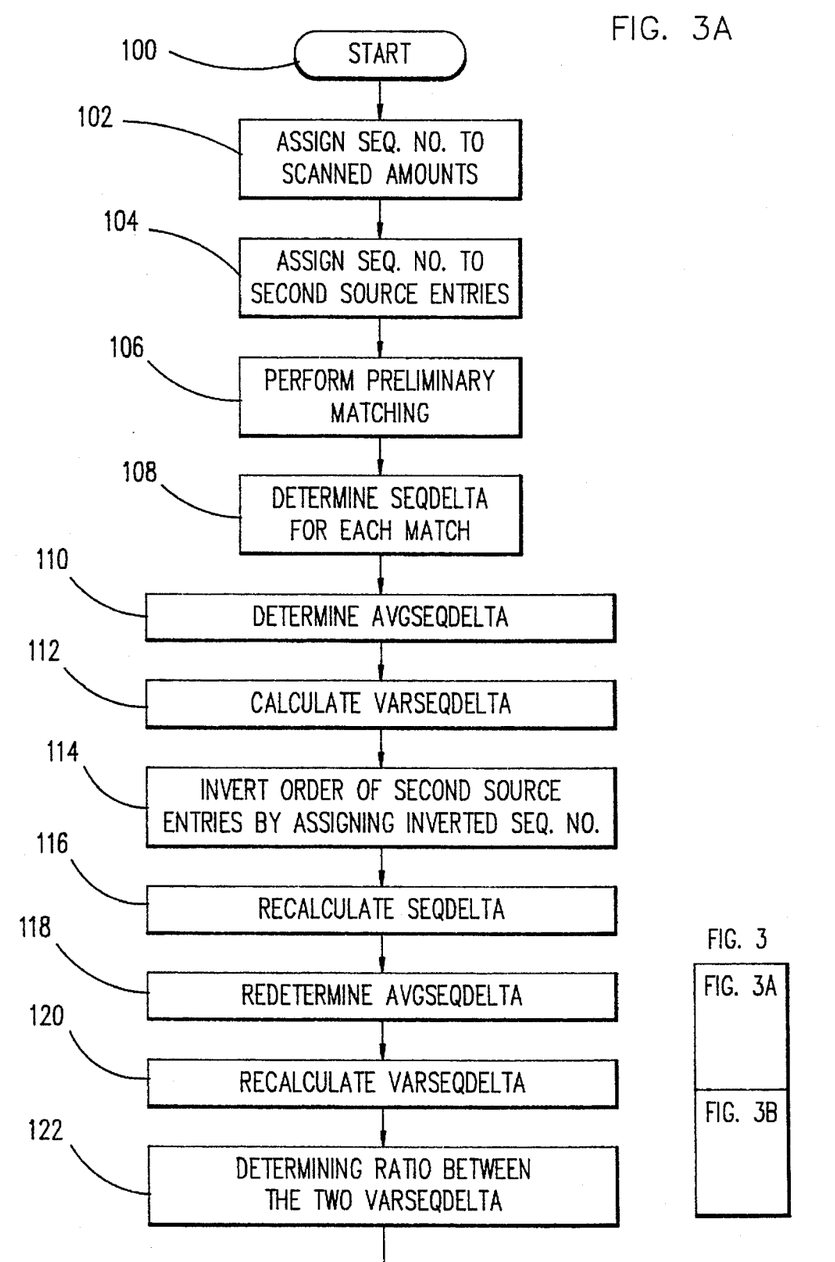
Figure 3B:
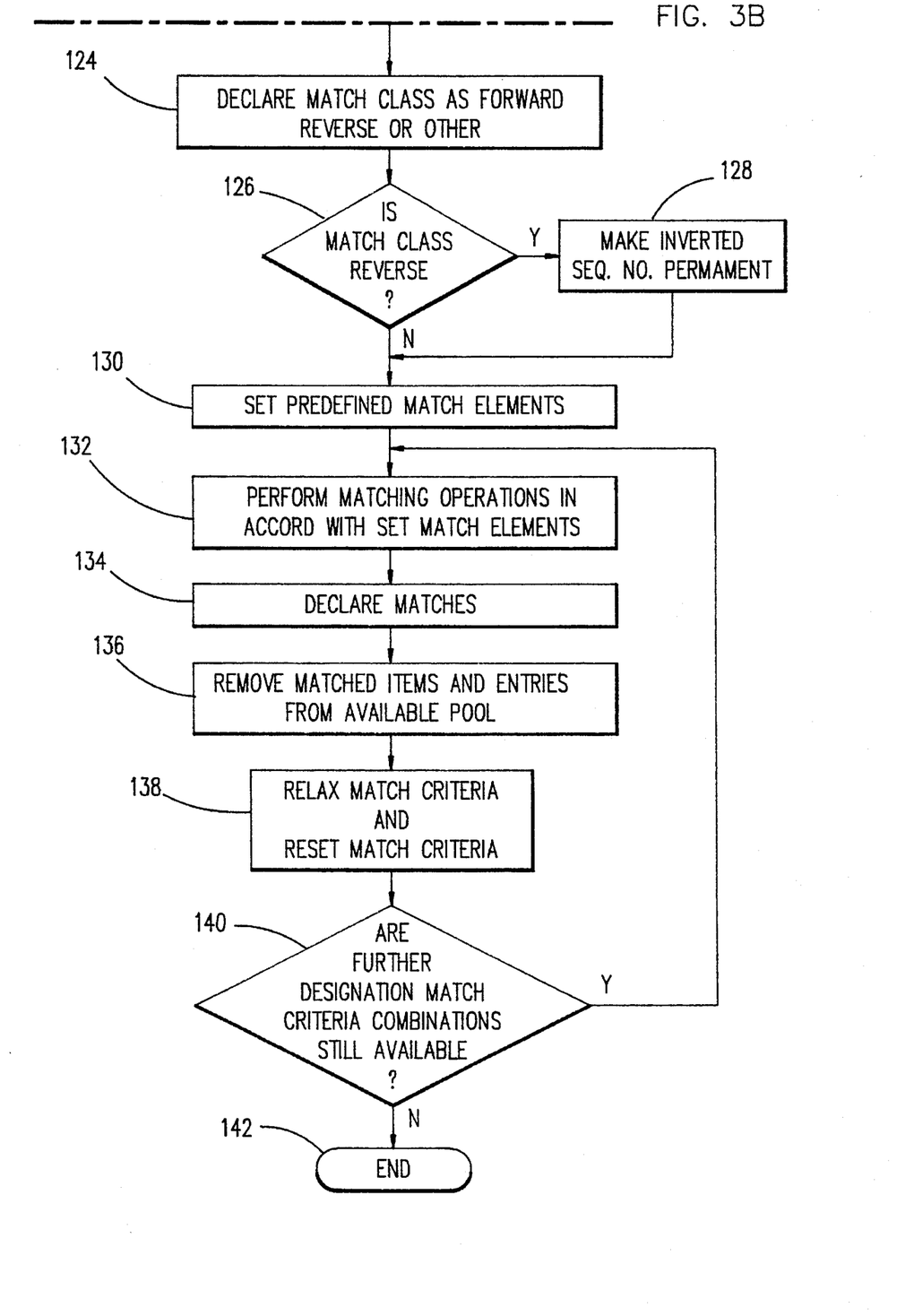

With reference to FIG. 3, the process of the subject invention is illustrated in flow diagram form. The preferred embodiment of the process is to program a computer to perform the individual process operation. A programmer of skill in the art and understanding current state of the art character recognition process may use the process flow of FIG. 3 to program the computer.

Entry into the process is at the starting point 100. The flow progresses from start operation 100 to operation 102 where the sequence numbers 24 of the negotiable instruments or checks, such as check 10, of FIG. 1 are assigned.

Similarly in operation 104, the sequence numbers are assigned to the second source entries as illustrated in column 38. Thereafter, a preliminary matching operation is performed at operation 106. During the preliminary matching in operation 106, "courtesy" amounts 14 from the checks 10 are compared with the entries on the second source list 26 in FIG. 2. The "courtesy" amounts 14 in column 16 are character recognized. The amounts in column 16 which match and correspond exactly with the amounts in the second source tape 26 would be recognized as those matches which are most easily made under the strictest match conditions. Upon the completion of the preliminary matching operation in operation 106, the SeqDelta is determined for each of the pairs of matched amounts and entries. Once all the SeqDeltas have been determined in operation 108, then the AvgSeqDelta is determined mathematically in operation 110.

Following the determination of the AvgSeqDelta in operation 110, the information necessary to calculate the VarSeqDelta is available and the calculation of VarSeqDelta is accomplished in operation 112 utilizing the relationship set forth in equation 1 above. Once the calculations in operation 112 have been completed, then the order of the second source 26 entries is inverted by assigning an inverted sequence number. The assignment of the inverted sequence number is accomplished by the calculation set forth with equation 2 above.

Once the inverted order of the second source 26 entries has been established in operation 114, the SeqDelta for each of the matched pairs of first source items and second source entries preliminarily matched in operation 106 is recalculated using the inverted SeqDelta numbers as assigned in operation 114.

Thereafter, in operation 118 the AvgSeqDelta is redetermined by mathematically averaging the SeqDelta values determined in operation 116, for the inverted listing.

Using the result of operation 118, operation 120 recalculates the VarSeqDelta value for the inverted listing. Thereafter, the ratio of the VarSeqDelta calculated in operation 112 to the VarSeqDelta established in operation 120 is determined. The determination of the ratio in operation 122 then leads to the declaration of a matched class of either FORWARD, REVERSE or OTHER in operation 124. FORWARD indicates that the order of the two lists 16, 26 are the same. REVERSE indicates the order of the two lists 16, 26 run counter to each other. OTHER indicates that the lists 16, 26 do not have sufficient sequence correspondence to be declared either FORWARD or REVERSE.

Once the match class has been established and declared in operation 124, a determination is made as to whether the declaration of the match class is REVERSE in operation 126. In the event that the match class is declared REVERSE, then the flow branches to operation 128 wherein the sequence numbers 38 determined for each of the entries in the second source listing 26 in FIG. 2 are made permanent, and all further operations utilize that REVERSE sequence number.

The flow from both operation 126 upon a negative determination of a REVERSE match class or after completion of operation 128 is to operation 130 where the predefined match elements are set in their initialized condition.

Utilizing the predetermined match element as set in operation 130, the matching of operation 132 is performed in accord with the set match elements; and matches for those first source item amounts and those second source entries which match under the requirements of the set match elements are declared matches in operation 134. Upon the declaration of a match in operation 134, the matched first source item is removed from the available pool of items in column 16 and the matched entry is removed from the available entries in the listing representing the second source tape 26 so those amounts are no longer available for consideration in future matching operations.

Thereafter, in operation 138, the match criteria is relaxed in accord with predetermined sequence of match criteria settings, and the match criteria is reset to a new set of conditions. The match criteria settings for each match criteria and the related settings within each iterative matching stage are shown in Table 1 above.

Following resetting of the match criteria to the new conditions, in operation 138, a determination is made as to whether further unconsidered match criteria combinations remain to determine matches may be made. If further criteria combinations exist that have not been utilized, the flow branches at that point through the YES path back to where the flow reenters operation 132. This process is a continuous loop through operations 132, 134, 136, 138 and 140 until such time as there are no further criteria combinations which have not been utilized in attempts to make matches. At the point that the determination in operation 140 is in the negative, the match routine illustrated in FIG. 3 is terminated at the end of operation 142. The results of the routine as illustrated in FIG. 3 are now available for further processing operations which are not a part of this process.

Once the matching process has iterated through all the stages necessary for a relatively complete relaxation of the match criteria, either all first source items and second source entries may have been declared as matches or there may remain first source items and second source entries which cannot be matched. At the point where all stages have occurred and some items remain unmatched, the entire deposit may be routed to the balancing section where a clerk may need only to observe a few remaining images which are unmatched together with the image of the second source 26 tape in order to correct the scanned first source item "courtesy" 16 amounts and thereby complete the balancing of the deposit. This accomplishes a major time and economic savings over manually matching items and amounts.

Once the deposit has been balanced, other actions may occur which are not part of this invention but which enhance the further processing of the instruments through the financial system, such as the imprinting of the dollar amount on the lower right corner of the check using the E13B type font and MICR ink so that thereafter the amount of the check is clearly recognizable to check processing equipment.

The first source item amounts which have rejected numbers or substitution errors may be corrected to the appropriate amount to correspond with the second source entries dependent upon the availability of computers and associated software which may factor into the process the confidence factors which are typically available in optical character recognition apparatus.

The recognition assistance provided by progressively decreasing the stringency of the match criteria to permit an ever-increasing number of matches improves the efficiency of the optical scanning and character recognition analysis apparatus in the financial transaction environment. It correspondingly reduces the requirements for human intervention except in cases where the character recognition analysis algorithms are incapable of recognizing the handwritten "courtesy" amounts on checks to a degree that matches may be declared.

While the match elements described herein are exemplary of match elements to be considered in an assisted character recognition scheme, either additional or different match elements may be defined by one wishing to utilize other criteria. The match elements are exemplary and not intended to limit the process described herein only to those match elements.

Additionally, although the sequence of relaxation is the preferred embodiment for this invention as contemplated by the inventor, the order in which the match element criteria are changed or relaxed during the iterative process of matching may be selected to suit the needs of the individual situation.

Match elements and the sequence of criteria relaxation during successive stages of matching may be changed or altered without departing from the scope of the invention as defined in the attached claims.

I claim:

1. A method of matching a plurality of item amounts from individual items stored in a memory associated with a scanner as a first source list with item amounts contained in a second source list, comprising the steps of:

a) performing character recognition on scanned item amounts from said individual items to form a first source list and on item amounts scanned from a second source list;

b) establishing a plurality of match criteria each allowing for a varying degree of adherence for determining a match between an item amount from said first source list and an item amount contained in said second source list;

c) matching said item amounts of said items contained in said first source list with said item amounts contained in said second source list where exact matches occur;

d) relaxing at least one of said criteria;

e) matching item amounts from said first source list with item amounts contained in sad second source list using the relaxed criteria;

f) repeating steps d and e until all of said criteria have been relaxed;

g) determining the order of said items on said second source list and correlating said order with the order of item amounts from said first source list; and h) determining a FORWARD or REVERSE match class comprising the steps of:
   1) assigning a sequence number to each item amount from said first source list;
   2) assigning a sequence number to each item amount on said second source list;
   3) determining a sequence delta for each matched set of item amounts;
   4) averaging said sequence deltas;
   5) calculating the statistical variance of said sequence deltas;
   6) inverting said second source list item amounts order;
   7) repeating steps 2 through 5;
   8) comparing said calculated statistical variances:
   9) designating said match class as FORWARD or REVERSE, depending upon which calculation of step 5 resulted in a lower statistical variance result and one of said statistical variance results being at least larger than a predetermined number of times the other statistical variance, thereby establishing matches between item amounts from said first source list and item amounts from said second source list using progressively lower degrees of adherence to said match criteria.

2. A method of matching a plurality of item amounts from individual items stored in a memory associated with a scanner as a first source list with item amounts contained in a second source list, comprising the steps of:

a) performing character recognition on scanned item amounts from said individual items to form a first source list and on item amounts scanned from a second source list;

b) establishing a plurality of match criteria each allowing for a varying degree of adherence for determining a match between an item amount from said first source list and an item amount contained in said second source list;

c) matching said item amounts of said items contained in said first source list with said item amounts contained in said second source list where exact matches occur;

d) relaxing at least one of said criteria;

e) matching item amounts from said first source list with item amounts contained in said second source list using the relaxed criteria;

f) repeating steps d and e until all of said criteria have been relaxed;

g) determining the order of said items on said second source list;

h) correlating said order with the order of items amounts from said first source list;

i) further determining a FORWARD or REVERSE match class comprising the substeps of:
   1) assigning a sequence number to each item amount from said first source list;
   2) assigning a sequence number to each item amount on said second source list;
   3) determining a sequence delta for each matched set of item amounts;
   4) averaging said sequence deltas;
   5) calculating the statistical variance of said sequence deltas;
   6) inverting said second source list item amounts order;
   7) repeating steps 2 through 5;
   8) comparing said calculated statistical variances;
   9) designating said match class as FORWARD or REVERSE, depending upon which calculation of step 5 resulted in a lower statistical variance result and one of said statistical variance results being at least larger than a predetermined number of times the other statistical variance, wherein said match criteria includes the following degrees of adherence for determining said match:

only item amounts from said first source list with no rejected characters will be considered for matching, and item amounts from said first source list having a rejected character will be considered for matching, thereby establishing matches between item amounts from said first source list and item amounts from said second source list using progressively lower degrees of adherence to said criteria.

3. The method of claim 2 wherein said criteria for matching includes the following degrees of adherence for determining said match:

only second source list item amounts having no rejected characters will be considered for matching; and only second source list item amounts having rejected characters will be considered for matching.

4. The method of claim 2 wherein said criteria for matching includes the following degrees of adherence for determining said match:

only item amounts from said first source list and second source list item amounts with respective character counts differing by a quantity of one will be considered for matching, and only item amounts from said first source list and second source list item amounts with respective character counts equal will be considered for matching.

5. The method of claim 2 wherein said criteria for matching includes the following degrees of adherence for determining said match:

item amounts from said first source list and second source list will be matched only if their respective non-rejected characters are identical, and item amounts from said first source list and second source list will be matched only if their respective non-rejected characters are identical except for one and only one character which may differ between an item amount from said first source list and an item amount from said second source list.

6. The method of claim 2 wherein said criteria for matching includes the following degrees of adherence for determining said match:

a sequence delta for a prospective match of an item amount from each of said source lists differs from said average sequence delta for all previously matched sets of said item amounts from each of said source lists by a quantity less than a predetermined quantity without regard to sign.

7. The method of claim 2 wherein said criteria for matching includes the following degrees of adherence for determining said match:

item amounts from said first source list and item amounts from said second source list may be matched without regard to said item amounts residing within a sequence of item amounts from said first source list and within a sequence of item amounts from said second source list respectively having other previously matched item amounts and said other previously matched item amounts having identical sequence delta values, and item amounts residing within a sequence of item amounts from said first source list may be matched only to item amounts from said second source list residing within a sequence of item amounts from said second source list, both sequences having other matched item amounts and said other matched item amount having identical sequence delta values.

8. The method of claim 2 wherein said criteria for matching includes the following degrees of adherence for determining said match:

only second source list item amounts with no rejected characters will be considered for matching; and only second source list item amounts with rejected characters will be considered for matching.

9. The method of claim 8 wherein said criteria for matching includes the following degrees of adherence for determining said match:

only item amounts from said first source list and item amounts from said second source list with respective character counts differing by a quantity of one will be considered for matching, and only item amounts and from said first source list and item amounts from said second source list with equal character amounts will be considered for matching.

10. The method of claim 9 wherein said criteria for matching includes the following degrees of adherence for determining said match:

item amounts from said first source list and second source list will be matched only if their respective non-rejected characters are identical, and item amounts from said first source list and second source list will be matched only if their respective non-rejected characters are identical except for one and only one character which may differ between an item amount from said first source list and an item amount from said second source list.

11. The method of claim 10 wherein said criteria for matching includes the following degrees of adherence for determining said match:

a sequence delta for a prospective match of an item amount from each of said source lists differs from said average sequence delta for all previously matched sets of said item amounts from each of said source lists by a quantity less than a predetermined quantity without regard to sign.

12. The method of claim 11 wherein said criteria for matching includes the following degrees of adherence for determining said match:

item amounts from said first source list and item amounts from said second source list may be matched without regard to said item amounts residing within a sequence of item amounts from said first source list and within a sequence of item amounts from said second source list respectively having other previously matched item amounts and said other previously matched item amounts having identical sequence delta values, and item amounts residing within a sequence of item amounts from said first source list may be matched only to item amounts from said second source list residing within a sequence of item amounts from said second source list, both sequences having other matched item amounts and said other matched item amount having identical sequence delta values.

* * * * *